Dec. 29, 1925.
G. KOWALZCYK ET AL
1,567,276
TIRE TOOL
Filed March 27, 1923
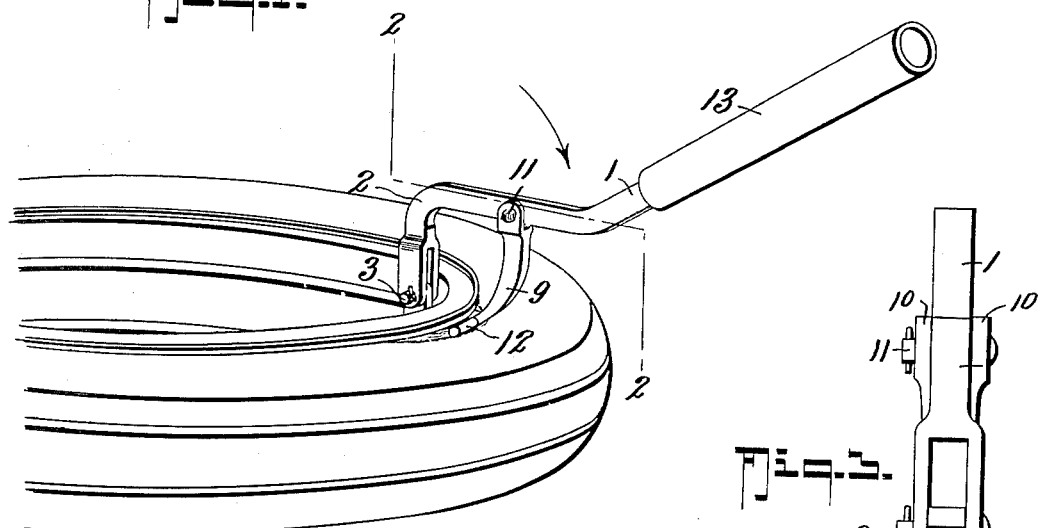
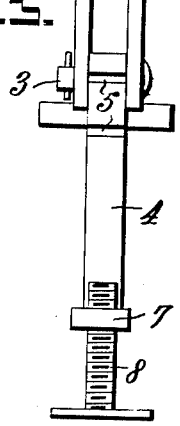
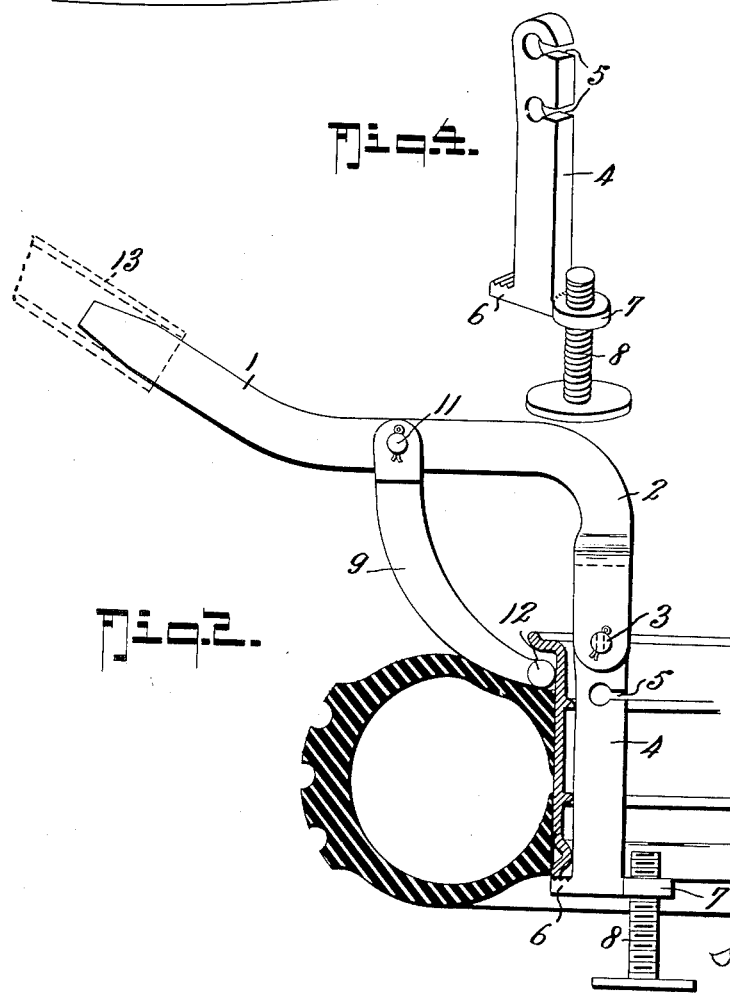
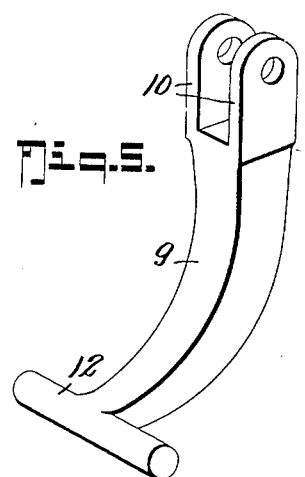
INVENTOR
Gust Kowalzcyk.
Joseph Kowalzcyk.
BY
H. Winship Wheatley
ATTORNEY Patented Dec. 29, 1925.

1,567,276

UNITED STATES PATENT OFFICE.

GUST KOWALZCYK AND JOSEPH KOWALZCYK, OF HOUTZDALE, PENNSYLVANIA, ASSIGNORS OF ONE-THIRD TO GEORGE H. McGRATH, OF HOUTZDALE, PENNSYLVANIA.

TIRE TOOL.

Application filed March 27, 1923. Serial No. 628,080.

*To all whom it may concern:*

Be it known that we, GUST KOWALZCYK and JOSEPH KOWALZCYK, citizens of the United States, residing at Houtzdale, in the county of Clearfield and State of Pennsylvania, have invented a new and Improved Tire Tool, of which the following is a specification.

Our invention relates to certain new and useful improvements in tools for removing tires of the straight side type from their rims and in its general nature the invention has for its object to provide a tool of a simple and effective construction which can be easily and cheaply manufactured and which will effect its intended purposes.

In its general nature, the invention comprises an L lever, to one end of which is adjustably pivotally connected a rim engaging jaw having provisions for supporting the tire and rim, a second jaw being secured to the lever to engage the tire and push it crosswise off the rim.

In its more detailed nature, the invention includes those novel details of construction, combination and arrangement of parts all of which will be first fully described, then be specifically pointed out in the appended claim and illustrated in the accompanying drawing, in which:

Figure 1 is a perspective view showing the invention in use.

Figure 2 is a cross section on the line 2—2 of Figure 1.

Figure 3 is an end elevation of the tool.

Figure 4 is a detail perspective view of the adjustable jaw.

Figure 5 is a detail perspective view of the tire side engaging jaw.

In the drawing, in which like numerals or reference indicate like parts in all of the figures, the operating lever is of L shape including the short arm 2 and the long arm 1, the end of which is bent slightly to fit into a handle extension 13, by means of which the tool may be operated. The short arm of the lever is bifurcated and carries a pin 3, the bifurcations receiving the jaw 4, the jaw 4 having open key-hole slots 5 to fit on the pin 3, the pin 3 being flattened on two sides to pass into the key-hole slot.

The jaw 4 has a serrated heel 6 to engage the rim and a jaw extension 7 to receive the adjusting bolt-like member 8 which serves as a support for the tire and rim while the tire is being removed from the rim.

9 is the pusher jaw which is pivoted at 11 to the long arm of the lever, it being bifurcated at 10 to straddle the lever and at its free end has a cross member 12 forming a T head to engage the side of the tire during the pushing operation.

In using the invention, the tool is operated by placing the pivoted jaw 4 inside the circle of the rim with the heel 7 in engagement with the rim. The head of the jaw 9 rests against the upper side of the tire next to the rim with the bolt 3 located in the upper key-hole slot 5 of the jaw 4. The operator by bearing down on the handle 13 and moving the tool all around the rim will cause the tire to loosen. Then the jaw 4 is changed to locate the bolt 3 in the lower key-hole slot 5 and the tool replaced on the tire and rim and moved around the rim, while rocking the lever until the tire is entirely removed from the rim, the operation being indicated in Figure 1 of the drawing.

From the foregoing description, taken in connection with the accompanying drawing, it is thought the complete construction, operation and advantages of the invention will be clear to those skilled in the art.

What we claim is:

A portable tire tool comprising an L-lever having a handle portion extending at an angle to the lever proper, a straight jaw having a T end and adjustably secured to the short arm of said L lever, a curved pusher jaw pivoted to the other arm of said L lever and having a T end to engage the tire, the T head of said first mentioned jaw adapted to engage the rim, and an adjustable screw support threaded into the T head of said first mentioned jaw for the purposes described, said pusher jaw being arranged with its convex surface to be opposed to the tire when the tool is in use and the length of said straight jaw being approximately that of the width of the rim whereby to bring the pivot point down close to the rim, and all being arranged whereby a push action on the handle part of the lever will cause said pusher member to force the tire off the rim substantially as shown and described.

GUST KOWALZCYK.
JOSEPH KOWALZCYK.